July 14, 1964  H. L. GROSS  3,140,555
WATER KITE DEVICE
Filed June 24, 1963
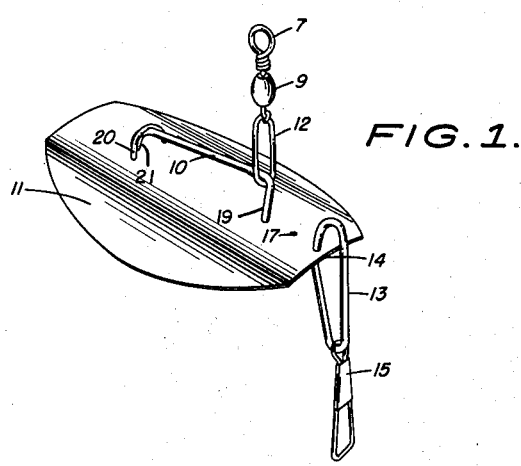
FIG. 1.
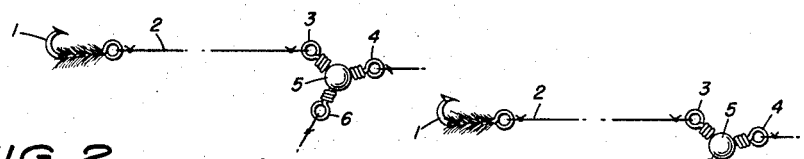
FIG. 2.
FIG. 3.
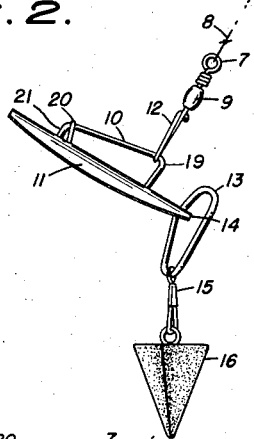
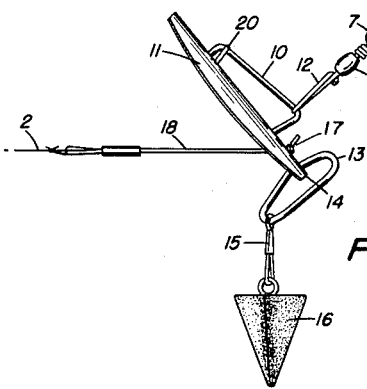
FIG. 4.
HERBERT L. GROSS
INVENTOR
BY Walter G. Finch
ATTORNEY

3,140,555
WATER KITE DEVICE
Herbert L. Gross, Parkton, Md.
Filed June 24, 1963, Ser. No. 290,077
5 Claims. (Cl. 43—43.13)

This invention relates generally to fishing devices, and more particularly the invention pertains to trolling vanes.

It is an object of this invention to provide a kiting device for trolling fishlines which will ride lightly or heavily as desired for surface or deep fishing upon command.

Another object of this invention is to provide a trolling kite for deep fishing which dives easily to great depth using a relatively light sinker weight and which aids in rising when the bait is to be retrieved or when a fish is hooked.

To provide a water kite controllable for diving or rising attitudes by means of manipulating the tow line, is still another object of this invention.

Other objects and attendant advantages of this invention will become more readily apparent and understood from the following detailed specification and accompanying single sheet of drawings in which:

FIG. 1 is a perspective view of a trolling kite, with the weight removed, embodying features of this invention;

FIG. 2 is a side view of the kite of FIG. 1 rigged for fish trolling and shown in the dive position;

FIG. 3 is the same view as FIG. 2 but showing the kite rig in the rise position; and FIG. 4 is another rig arrangement of the trolling kite adapted for very deep or fast bottom trolling.

Referring now to the details of the drawings, FIGS. 1 to 4 inclusive show a preferred embodiment of the novel trolling kite incorporating features of this invention and it consists of an elongated oval kite plate 11 which is arcuately curved transversely to its long axis. The axial ends, that is the top and bottom of the kite plate are cut off squarely.

A straight stiff wire slide bar 10 is provided which is formed at its ends with legs 19 and 21. These legs are welded on the long axis of the plate 11 so that the bar extends over the center portion above the convex side. Because leg 19 is the longer of the two, this end of bar 10 is spaced farther from the lower end of the plate as shown. An elongated drop line closed loop element 12 engages this bar 10 and is provided with a snap swivel 9.

One side of a closed elongated sinker slide loop 13 is welded, intermediate its ends, to the lower end 14 and on the axial center line of the plate 11. A safety pin 15 is engaged with this loop 13 so as to freely slide on its unwelded straight side.

A looped bridge wire 20 is welded across the top and upper end of the slide bar 10 nearest leg 21 and to the kite plate 11.

The water kite is rigged for fishing, as shown in FIG. 2 by attaching a sinker 16 to the safety pin 15.

The usual bait hook 1 is secured with a bait leader 2 of twenty or thirty foot length to the eye 3 of a three-way swivel 5.

The fisherman's rod line is attached to the eye 4 of this swivel 5 and eye 6 is used to extend a twelve to eighteen inch drop line 8 to the eye 7 of the swivel 9 of the water kite.

The water kite so rigged trolls in two positions, namely, a dive position and a rise position as illustrated in FIGS. 2 and 3, respectively. In the rise position (FIG. 3), the convex face of the plate 11 is tilted toward the fisherman and the towing tension through loop element 12 is applied to the upper end of the slide bar 10 against bridge 20. The sinker 16 is suspended below on the lower end of element 13 as shown. The trolling speed or size of sinker 16 is adjusted so the kite runs at or near the water surface. Because the sliding portions of bar 10 and loop 13 are straight, the only stable engagement locations thereon for elements 12 and 13 respectively are at their ends.

It will be noted the effective ends of bar 10 define three significant zones or areas, namely $A_1$, $A_2$, and $A_3$ making up the convex side or sail area of the kite plate 11. Area $A_1$ is the sail area at the bottom and extending to the sinker slide loop 13. Area $A_3$ is the sail area extending to the opposite or top end while area $A_2$ is the sail area at the center portion, the length of the bar 10.

This area $A_2$ works with or against either of the other two areas $A_1$ and $A_3$ to determine the attitude of the plate 11, depending on which end of bar 10 is engaged by element 12. With tension being applied by drop line element 12 at the bridge 20 or upper end of bar 10, area $A_2$ is additive to area $A_1$ and area $A_3$ is relatively ineffective in the water stream. Also, with the sinker 16 depending from the loop 13 at the end corresponding to the convex sail side, the attitude of plate 11 is still further determined.

A sudden forward jerk of the fisherman's line causes the kite plate 11 to rise up and tilt over backward. The sinker 16 slides suddenly back on loop element 13 as shown in FIG. 2 and the diving position is assumed with drop line loop 12 now at the bottom end of slide bar 10. Since now the force of sail area $A_2$ has been transferred to combine with the sail force of area $A_3$, this is a second stable condition.

In this position the kite rides down to the vicinity of the bottom of the body of water at a preset angle that is determined by the angle of the straight side of loop element 13 and also by the angle of slide bar 10 relative to the surface of plate 11.

This dive attitude will continue until the kite reaches its maximum depth or strikes something on the bottom of the water. In the latter case, the drag of the sinker 16 will cause plate 11 to tilt forward at its upper end and thus allow loop element 12 to slide to the top of bar 10.

The drop line 8 transfers its pull upon the slide bar 10 to the top end causing the sail area $A_2$ to combine with sail area $A_1$ and override the force against area $A_3$. The safety pin element 15 with sinker 16 now slides forward on loop element 13. This places the kite in a rising attitude and permits it to return to the surface of the water.

Bridge 20 operates to keep the kite plate 11 in a tilted position against the water stream especially near the surface. Without this bridge 20, it has been found the plate 11 will flatten too much and allow the drop line loop element 12 to be pushed to the bottom of bar 10 by the water pressure against it and the fisherman's rod line as it moves forward in the water and this causes the kite to dive again. A further benefit of the bridge 20 is to stabilize the kite from side-to-side oscillation.

It is possible to change from dive attitude to rise attitude by slacking or paying out the fish line for an instant to cause the element 12 to transfer to the top of the bar 10.

The above related functions, it will be noted, are effective in permitting deep fishing with a relatively light sinker permitting the force of the water stream to be added or subtracted from that of the sinker.

Another feature of the invention is that a fish striking the bait will trip the kite from a dive attitude to a rise attitude in the same way as a deliberate slackening of the line and thus help to raise the fish to the surface.

FIG. 4 illustrates the rigging of the kite arrangement for very deep or fast bottom fishing. Instead of securing the bait leader 2 to a three-way swivel above the kite it is attached instead to a short looped line 18 which is tied to an aperture 17 on the axis of plate 11 and intermediate the lower end of slide bar 10 and sinker slide loop 13. The tripping action is as previously related.

Obviously, many modifications and variations of the present invention are possible in light of the above teachings. It is, therefore, to be understood that within the scope of the appended claims, the invention may be practiced otherwise than as specifically described.

What is claimed is:

1. In combination with a sinker for fishing tackle, a trolling kite comprising a substantially elongated oval shaped plate arcuately curved transversely to its major axis and having a lower, sinker end, and an upper rising end, a rigid slide bar extending over the center portion of said plate above the convex side thereof and at an inclined angle to said major axis of said oval shaped plate, said slide bar being positioned a greater distance from said oval shaped plate at its lower sinker end than at its upper rising end, means including a looped bridge element secured across the top and upper end of said slide bar and to said kite plate, means including an elongated closed slide loop engageably connected to said slide bar and slidable therealong, means including a swivel connected to said closed slide loop, means including a swivel having at least three eyes connected thereto, a fishing rod line attached to one of said eyes, a fishing hook attached to a second of said eyes, and a drop line attached to the third of said eyes and to said swivel connected to said closed slide loop, a sinker slide loop having an arcuate side and an opposite straight side, with said arcuate side of said sinker slide loop being rigidly secured intermediate its ends to the lower end of said oval plate and along the major axis of said oval plate and positioned substantially transversely to said oval plate, and means including a pin element having one end engageable with said sinker slide loop and arranged to freely slide on the straight side of said sinker slide loop and having its other end coupled to a sinker.

2. In combination, a trolling kite consisting of an elongated oval shaped plate arcuately curved transversely to its principal axis and having a lower sinker end and a rising upper end, means including a rigid slide bar having angularly positioned ends of unequal length secured along said principal axis of said oval shaped plate with said slide bar extending over the center portion of said plate above the upper side thereof and at an inclined angle to said principal axis of said plate, said slide bar being positioned a greater distance from said plate at its lower sinker end than at its upper rising end, means including a looped bridge element secured across the top and upper end of said slide bar nearest the shorter end thereof and to said plate, means including an elongated closed slide loop engageably connected to said slide bar and slidable therealong, swivel means connected to said closed slide loop, swivel means having at least three eyes connected thereto, a fishing rod line attached to one of said eyes, a fishing hook attached to a second of said eyes, and a drop line attached to the third of said eyes and to said swivel connected to said closed slide loop, a sinker slide loop having an arcuate side and an opposite straight side, with said arcuate side of said sinker slide loop being rigidly secured intermediate its ends to the lower sinker end of said oval plate and along said principal axis of said oval plate and positioned substantially tranversely to said oval plate, a sinker, and means including a pin element having one end engageable with said sinker slide loop and arranged to freely slide on the straight side of said sinker slide loop and having its other end coupled to said sinker.

3. A trolling kite for use with fishing tackle, comprising an elongated oval plate arcuately curved transversely to its major axis and having a lower end and a rising upper end, a rigid slide bar having angularly positioned ends of unequal length secured along the major axis of said oval plate with said slide bar extending over the center portion of said plate above the upper side thereof and at an inclined angle to the major axis of said plate, with said slide bar being positioned a greater distance from said plate at its lower end than at its upper end, means including a looped bridge element secured across the top and upper end of said slide bar nearest the shorter end thereof and to said kite plate, a slide loop having an arcuate side and an opposite straight side, with said arcuate side of said slide loop being secured intermediate its ends to the lower end of said oval plate and along the major axis of said oval plate and positioned substantially transversely to said oval plate, and a sinker and line attachment means connected to said slide loop and said slide bar, respectively.

4. A trolling kite, comprising, an elongated oval shaped plate arcuately curved transversely to its major axis and having an upper rising and a lower end, a rigid slide bar having angularly positioned ends of unequal length secured along the major axis of said oval plate with said slide bar extending over the center portion of said plate above the upper side thereof and at an inclined angle to the major axis of said plate, with said slide bar being positioned a greater distance from said plate at its lower end than at its upper end, means including a looped bridge element secured across the top and upper end of said slide bar nearest the shorter end thereof and to said kite plate, means including an elongated closed slide loop engageably connected to said slide bar and slidable therealong, swivel means connected to said closed slide loop, swivel means having at least three eyes connected thereto, a line attached to one of said eyes, an element to be engaged attached to a second of said eyes, and a line attached to the third of said eyes and to said swivel connected to said closed slide loop, a sinker slide loop having an arcuate side and an opposite straight side, with said arcuate side of said slide loop being secured intermediate its ends to the lower end of said oval plate and along the major axis of said oval plate and positioned substantially transversely to said oval plate, and means including a pin element having one end engageable with said slide loop and arranged to freely slide on the straight side of said sinker slide loop and having its other end coupled to an element to be lifted.

5. In combination with a sinker for fishing tackle, a trolling kite comprising an elongated oval plate arcuately curved transversely to its major axis and having an upper rising end and a lower sinker end, a rigid slide bar having angularly positioned ends of unequal length secured along the major axis of said oval plate with said slide bar extending over the center portion of said plate above the upper side thereof and at an inclined angle to the major axis of said plate, with said slide bar being positioned a greater distance from said plate at its lower end than at its upper rising end, means including a looped bridge element secured across the top and upper end of said slide bar nearest the shorter end thereof and to said kite plate, an elongated closed slide loop engageably connected to said slide bar and slidable therealong, a swivel connected to said closed slide loop, a swivel having at least three eyes connected thereto, a fishing rod line attached to one of said eyes, a hook attached to a second of said eyes, and a drop line attached to the third of said eyes and to said swivel connected to said closed slide loop, a sinker slide loop having an arcuate side and an opposite straight side, with said arcuate side of said sinker slide loop being secured intermediate its ends to the lower sinker end of said oval plate and along the major axis of said oval plate and positioned substantially transversely to said oval plate, and means including a pin element having one end engageable with said sinker slide loop and arranged to freely slide on the straight side of said sinker slide loop and having its other end coupled to said sinker.

References Cited in the file of this patent

UNITED STATES PATENTS

| | | |
|---|---|---|
| 2,220,302 | Thorne | Nov. 5, 1940 |
| 2,235,868 | Coolidge et al. | Mar. 25, 1941 |